United States Patent

[11] 3,625,321

| [72] | Inventor | Dieter Lutz<br>Schweinfurt am Main, Germany |
|---|---|---|
| [21] | Appl. No. | 853,105 |
| [22] | Filed | Aug. 26, 1969 |
| [45] | Patented | Dec. 7, 1971 |
| [73] | Assignee | Fichtel & Sachs AG.<br>Schweinfurt am Main, Germany |
| [32] | Priority | Sept. 6, 1968 |
| [33] | | Germany |
| [31] | | P 17 75 663.7 |

[54] SHOCK ABSORBER AND FLUID-COMPENSATING MEANS
6 Claims, 5 Drawing Figs.

[52] U.S. Cl. .................................................. 188/298,
188/314, 188/315, 188/317, 188/322
[51] Int. Cl. .................................................. F16f 9/08
[50] Field of Search .......................................... 188/269,
298, 314, 315, 317, 322

[56] References Cited
UNITED STATES PATENTS

| 2,225,986 | 12/1940 | Glezen | 188/100 P UX |
| 2,357,278 | 8/1944 | O'Connor | 188/100 R X |

FOREIGN PATENTS

| 1,093,667 | 11/1954 | France | 188/100 R |
| 1,512,209 | 12/1967 | France | 188/100 R |

Primary Examiner—George E. A. Halvosa
Attorney—Low and Berman

ABSTRACT: In a shock absorber having a cylinder and two axially spaced pistons on the same piston rod, a tubular membrane attached to the piston rod between the pistons is filled with compressed gas to compensate for the changes in the cylinder volume available to a liquid when the piston rod moves into and out of the cylinder cavity. In a modified arrangement, the compensating chamber is mounted on the piston rod outside the cylinder behind a flexible membrane to which the liquid in the central cylinder compartment has access through a bore in the piston rod.

PATENTED DEC 7 1971 3,625,321
SHEET 2 OF 4
Fig. 2
Fig. 3
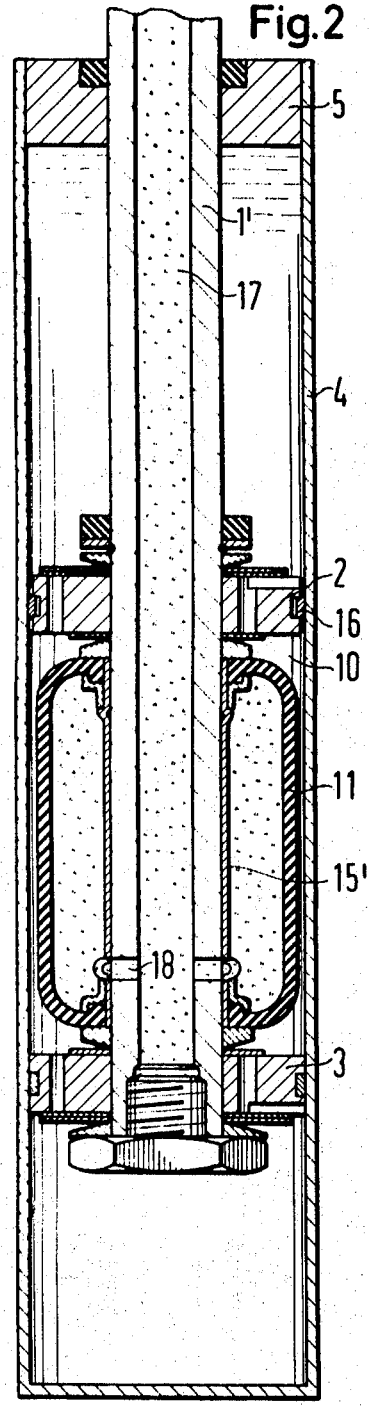
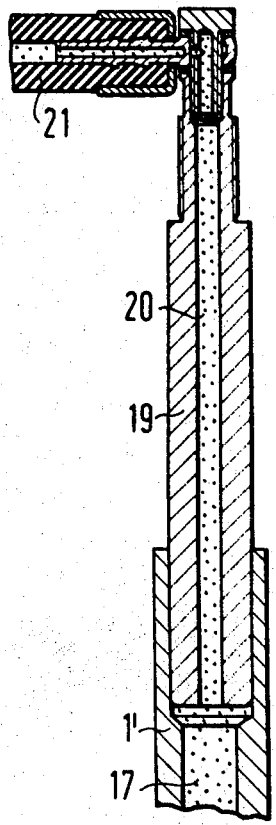
INVENTOR.
Dieter Lutz
By: Lane and Berman
AGENTS INVENTOR.
Dieter Lutz
BY: Low and Berman
AGENTS

SHOCK ABSORBER AND FLUID-COMPENSATING MEANS

This invention relates to hydropneumatic shock absorbers of the type commonly employed in automotive vehicles.

Shock absorbers with which this invention is more specifically concerned are equipped with a cylinder and a piston therein, and a piston rod extending outward of the cylinder from the piston rod. The shock-absorbing effect is obtained by liquid flowing through a throttling passage in the piston during relative movement of piston rod and cylinder. To compensate for the change in volume available to the liquid during the movement of the piston rod, a cushion of compressed gas is arranged in pressure-transmitting engagement with the practically noncompressible liquid.

It has been shown in French Pat. No. 1,512,209 that the compensating chamber may be mounted in the cylinder cavity on the piston rod, and this arrangement has significant advantages over earlier types of shock absorbers. However, the known device is quite complex in its structure and relies for operativeness on precise alignment of its moving elements and on close dimensional tolerances. It is therefore relatively expensive to build and to maintain in good working order. Moreover, its piston rod tends to jam under transverse stresses normally encountered when the known device is used in an independent suspension for the steered front wheel of a motorcar.

The primary object of this invention is the provision of a shock absorber which avoids the shortcomings of the aforedescribed known device, while retaining its desirable features.

With this object in view, the shock absorber of the invention is provided with two pistons fixed on the piston rod in axially spaced relationship which divide the cylinder cavity into two terminal and one central compartments. A compensating chamber is partly bounded by the inner face of a flexible wall mounted on the piston rod for movement with the same relative to the cylinder. A gas under a pressure much higher than atmospheric pressure is contained in the compensating chamber, and respective bodies of liquid extend in the aforementioned three compartments respectively in contact with the cylinder and communicate with each other through throttling passages in the pistons. The body of liquid which extends in the central compartment engages the outer face of the aforementioned flexible wall.

Other features, additional objects, and many of the attendant advantages of this invention will be readily appreciated as the same becomes better understood by reference to the following detailed description of preferred embodiments when considered in connection with the accompanying drawing in which:

FIG. 2 illustrates a second embodiment of the invention in view corresponding to that of FIG. 1;

FIG. 3 illustrates a portion of a shock absorber otherwise identical with the apparatus of FIG. 2 and in a corresponding view;

Figure 1:
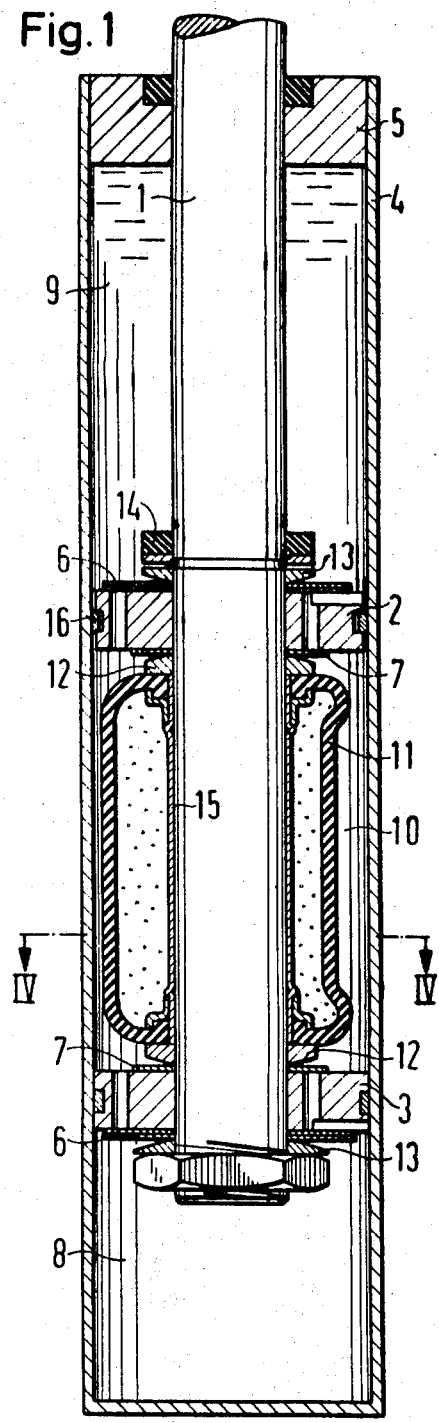
FIG. 1 shows a shock absorber of the invention in fragmentary elevational section on its axis.

Referring now to the drawing in detail, and initially to FIG. 1, there is seen as much of an automotive shock absorber of the invention as is necessary for understanding of its novel features.

The piston rod 1 of the shock absorber carries two fixedly fastened pistons 2,3 which are axially spaced in the cavity of a cylinder 4. The bottom end of the cylinder 4 is sealed, and the piston rod 1 projects axially through an annular cap 5 which closes the top of the cylinder in movably sealing and guiding engagement with the piston rod. Axial passages in the pistons 2,3 and associated flap valves 6,7 throttle the passage of liquid between the three compartments 8,9,10 of the cylinder cavity which are axially bounded by the pistons and the axial end walls of the cylinder 2.

The axial ends of a tubular diaphragm 11 are clamped in the central compartment 10 about the piston rod 1 between two washers 12 abuttingly adjacent the pistons 2,3 respectively and a spacer tube 15 axially extending between the washers and coaxially enveloping the piston rod 1. The sealed annular compensating chamber bounded by the flexible and resilient diaphragm 11 and the tube 15 is filled with a highly compressed gas, and the remainder of the cylinder cavity is filled with a practically noncompressible liquid, the outer face of the diaphragm 11 being engaged by the body of liquid extending in the central compartment 10 in contact with the cylinder 4. The pistons 2,3 and the diaphragm assembly are axially secured on the piston rod 1 between two annular retaining disks 13, the upper disk being held in position by a wire ring in a circumferential groove of the piston rod in the top compartment 9, and the lower disk being backed by a nut threadedly mounted on the free end of the piston rod 1 which slightly projects into the lowermost cylinder compartment 8 and abuts against the cylinder bottom at the end of the downward stroke of the piston rod 1.

A resilient ring 14 arranged on the piston rod 1 in the compartment 9 adjacent the disk 13 softens the impact of the piston rod and of the elements mounted thereon on the cap 5 when the piston rod is withdrawn from the cylinder 4 to the upper terminal position of its stroke. A sealing ring 16 on the piston 2 engages the inner wall of the cylinder 4 but is dimensioned to have some radial freedom of movement in the receiving groove of the piston 2, which defines a narrow annular gap with the inner cylinder wall. The piston 3 is slightly greater in diameter than the piston 2 and engages the cylinder wall with a sliding fit.

The otherwise closely similar or identical shock absorber shown in FIG. 2 has a tubular piston rod 1', and the axial bore 17 of the rod communicates with the airspace enclosed by the diaphragm 11 through bores 18 in the wall of the rod 1' and communicating openings in the spacer tube 15'. The top of the rod 1', not seen in FIG. 2, is sealed, and the bore 17 serves as a supplemental compensating chamber to increase the capacity of the diaphragm-enclosed space.

As is shown in FIG. 3, it is preferred to connect the outer or upper end of the piston rod 1' by means of a tubular adapter 19 to a leveling device, which may consist of a container of compressed gas and a control valve. The bore 20 of the adapter coaxially communicates with the bore 17 and leads to a flexible connector hose 21 of the leveling device, not otherwise shown. The gas pressure in the shock absorber may be varied by means of the nonillustrated valve by either admitting more gas to the bore 17 or by venting the bore to an area of lower pressure.

Figure 4:
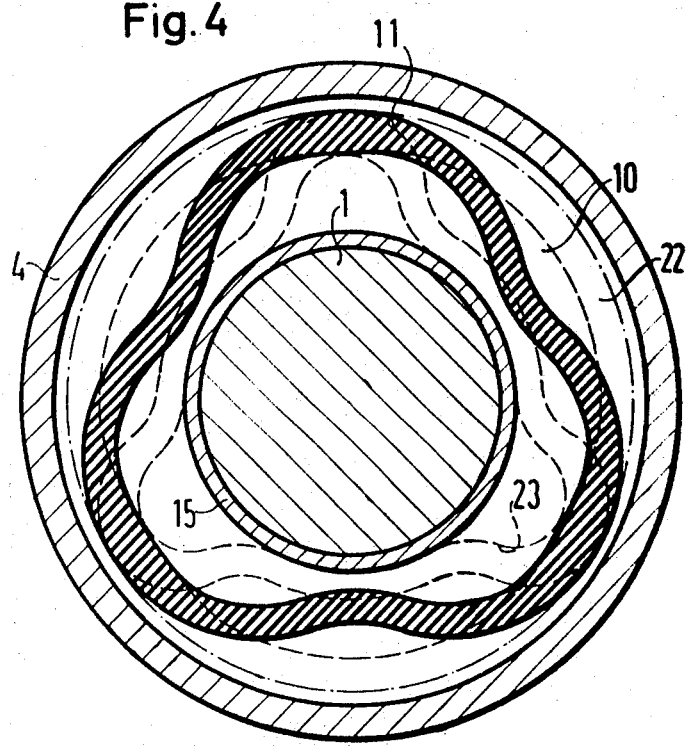
FIG. 4 shows the device of FIG. 1 in section on the line IV—IV.

The diaphragm 11, which is common to the devices of FIGS. 1 and 2, is shown in transverse section in FIG. 4 together with other elements of the shock absorber of FIG. 1. When relaxed in the normal position of the piston rod 1 at the approximate center of its stroke, the diaphragm assumes the fully drawn, trochoidal cross section, and its circumference has three pairs of rounded, axial ribs and grooves. The radial thickness of the diaphragm 11 varies angularly about the cylinder axis to avoid the formation of folds having a small radius of curvature which could shorten the useful life of the diaphragm.

When the piston rod 1 reaches its terminal position nearest the sealed bottom of the cylinder 2, the liquid displaced by the piston rod causes the diaphragm 11 to hug the spacer tube 15 along three arcs of about 90° each, as indicated by broken lines 23, and the gas in the compensating chamber to be further compressed accordingly. Outward movement of the piston rod 1 until the buffer ring 14 strikes the cap 5 causes the diaphragm 11 to be expanded to the practically cylindrical shape shown in chain-dotted lines at 22. It will be noted that the outer diameter of the fully expanded diaphragm is still smaller than the inner diameter of the cylinder wall so that the diaphragm is not exposed to frictional contact with the cylinder.

Figure 5:
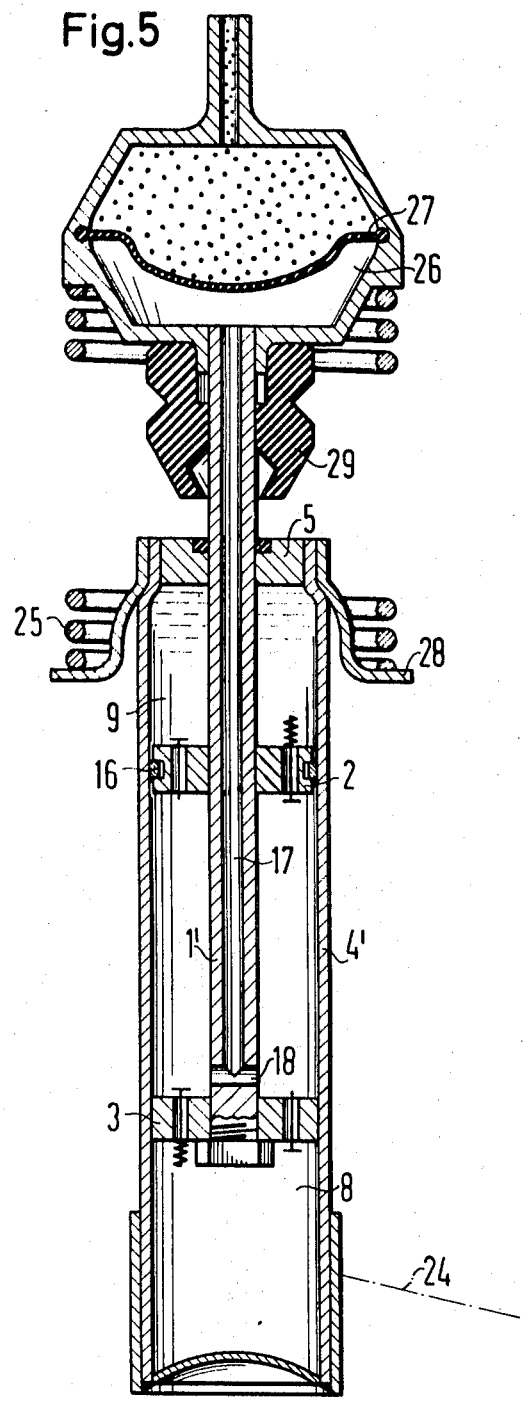
FIG. 5 is yet another elevationally sectional view of a shock absorber of the invention.

FIG. 5 shows an independent wheel suspension unit of the McPherson type embodying the basic features of the invention. A tubular piston rod 1', not significantly different from that described with reference to FIG. 2, carries two axially spaced pistons 2,3 which divide the cavity of a cylinder r' into three compartments 8,9,10 and are equipped with valved passages as described above and indicated in FIG. 5 by conventional symbols. The bottom end of the cylinder 4 is reinforced to permit the axle of the associated sprung wheel to be attached to the cylinder in a manner known in itself, the position of the axis of rotation of the wheel being indicated by a chain-dotted line 24 obliquely inclined to the axis of the cylinder 4'.

The diaphragm 11 and associated fastening and sealing elements are absent, and the radial bores 18 in the piston rod 1' directly communicate with the cylinder compartment 10 so that the bore 17 of the piston rod 1' is filled with liquid. The top end of the piston rod 1' outside the cylinder 4' carries a container 26 whose interior is divided into two axial portions by a flexible and resilient diaphragm 27 having a circumferential rim sealed to the inner wall of the container 26 along a circle perpendicular to the common axis of the cylinder 4', the piston rod 1', and the container. The latter is of circular cross section and tapers approximately conically upwardly and downwardly from the rim of the diaphragm 27.

A strong helical compression spring 25 is coaxially interposed between an external shoulder of the container 26 and a dished, annular spring seat 28 fixedly fastened to the top end of the cylinder 4'. A nipple integrally projecting from the top of the container 26 is connected with a leveling device, as described above with reference to FIG. 3, and the compensating chamber in the container 26 above the diaphragm 27 is filled with gas under high pressure, the lower portion of the container 26 being filled with the liquid which also occupies all available space in the cylinder 4' and the piston rod bore 17. A resilient bumper 29 depends from the chamber 26 toward the cap 5 of the cylinder 4'.

The several illustrated embodiments of the invention operate as follows:

When the piston rod 1,1' is pushed inward of the cylinder 4,4' by static or dynamic loading of the shock absorber, the piston 3 moves inward of the compartment 8, and the liquid displaced thereby moves through the throttling passages of the piston into the cylinder compartment 10. Simultaneously, the piston 2 moving outward of the compartment 9 causes liquid to flow through the passages in the piston 2 out of the compartment 10. Because of the additional volume of the piston rod introduced into the cylinder, the two changes in liquid capacity of the compartments 8,9 cause the liquid in the annular chamber 10 to compress the gas cushion retained by the diaphragm 11,27. The resulting change in gas pressure is greater under otherwise similar conditions in the apparatus of FIG. 1 than in the apparatus of FIG. 2.

When the load on the piston rod 1,1' is reduced, liquid flows from the compartment 9 into the compartment 10, and from the latter into the compartment 8, the net loss of liquid in the compartment 10 of fixed capacity due to removal of a portion of the piston rod from the cylinder cavity being made up by expansion of the gas cushion. The damping effect of the passages in the pistons 2,3 is commensurate with the velocity of piston movement.

The diaphragm 27 shown in FIG. 5 is remote from all elements of the shock absorber which move relative to each other. The diaphragm 11 is dimensioned so that it remains safely spaced from the cylinder wall in all operative conditions of the shock absorber. The relaxed trochoidal shape shown in FIG. 4 has been found to expose the diaphragm to a minimum of stresses during normal shock absorber operation, and thus to extend the useful life of the shock absorber. Elastomers resistant to the liquid in the shock absorber, such as oil-resistant synthetic rubber, are the preferred materials for the shock absorber diaphragm.

While an external spring and the position of a wheel axis have been indicated in FIG. 5 only, it will be appreciated that the shock absorbers shown in FIGS. 1 and 2 may equally form the central element of a McPherson-type wheel suspension. In such a suspension, the piston rod 1,1' is subjected to flexural stresses in an axial plane such as that of the drawing, and may jam in the cap 5 when sufficiently bent.

It has been found that the tendency for such jamming is significantly reduced by making the diameter of the piston 2 smaller than that of the piston 3. A difference of 0.2 to 0.6 mm. in the piston diameters of a shock absorber having the dimensions usual in automotive practice and a cylinder of uniform cross section at least over the stroke of the pistons 2,3 has been found to have significant beneficial effects. The clearance provided for the sealing ring 16 in the circumferential groove of the piston 2 is of similar magnitude to permit the ring to remain in contact with the cylinder wall under uniform contact pressure until the piston rod is bent sufficiently to cause some of the bending stress to be transmitted by the ring 16 to the cylinder wall, thereby reducing or preventing further bending of the rod 1,1'.

What is claimed is:

1. A shock absorber comprising, in combination:
   a. a cylinder having an axis and defining a cavity therein, said cavity being axially bounded by two end walls of said cylinder;
   b. a piston rod axially movable inward and outward of said cavity through one of said end walls in sealing engagement with said one end wall;
   c. two piston members fixedly mounted on said piston rod in axially spaced relationship.
      1. said piston members axially dividing said cavity into two terminal compartments and a central compartment,
      2. said central compartment being bounded radially by said piston rod and by said cylinder,
      3. said piston members being respectively near and remote from said one end wall,
      4. the outer diameter of said near piston members being smaller by about 0.2 to 0.6 millimeter than the outer diameter of said remote piston member,
      5. said cylinder having an inner wall of uniform cross section over the stroke of said piston members;
   d. flexible wall means having an inner face bounding a compensating chamber, said wall means being fixedly mounted on said piston rod for movement with the same relative to said cylinder and having an outer face;
   e. a gas under a pressure higher than atmospheric pressure in said compensating chamber; and
   f. respective bodies of a liquid extending in each of said compartments in contact with said cylinder, said piston members being formed with respective throttling passages connecting axially adjacent compartments,
      1. the body of liquid extending in said central compartment engaging said outer face.

2. A shock absorber comprising, in combination:
   a. a cylinder having an axis and defining a cavity therein, said cavity being axially bounded by two end walls of said cylinder;
   b. a piston rod axially movable inward and outward of said cavity through one of said end walls in sealing engagement with said one end wall;
   c. two piston members fixedly mounted on said piston rod in axially spaced relationship, said piston members axially dividing said cavity into two terminal compartments and a central compartment, said central compartment being bounded radially by said piston rod and by said cylinder;
   d. flexible wall means having an inner face bounding a compensating chamber, said wall means being fixedly mounted on said piston rod in said central compartment for movement with the same relative to said cylinder and having an outer face;
   e. a gas under a pressure higher than atmospheric pressure in said compensating chamber; and f. respective bodies of a liquid extending in each of said compartments in contact with said cylinder, said piston members being formed with respective throttling passages connecting axially adjacent compartments,
   1. the body of liquid extending in said central compartment engaging said outer face.
3. A shock absorber as set forth in claim 2, wherein said wall means include a diaphragm of flexible, resilient material mounted on said piston rod between said piston members and separating said gas from said body of liquid in said central compartment.
4. A shock absorber as set forth in claim 3, wherein said diaphragm is tubular about said axis and the radial thickness thereof varies angularly about said axis.
5. A shock absorber as set forth in claim 3, further comprising abutment means limiting the stroke of said piston rod movement to two axially spaced terminal positions, said diaphragm being of trochoidal shape in cross section transversely of said axis when said piston rod assumes a position intermediate said terminal positions.
6. A shock absorber as set forth in claim 5, said diaphragm when in the relaxed condition assuming said trochoidal cross-sectional shape.

* * * * *